UNITED STATES PATENT OFFICE.

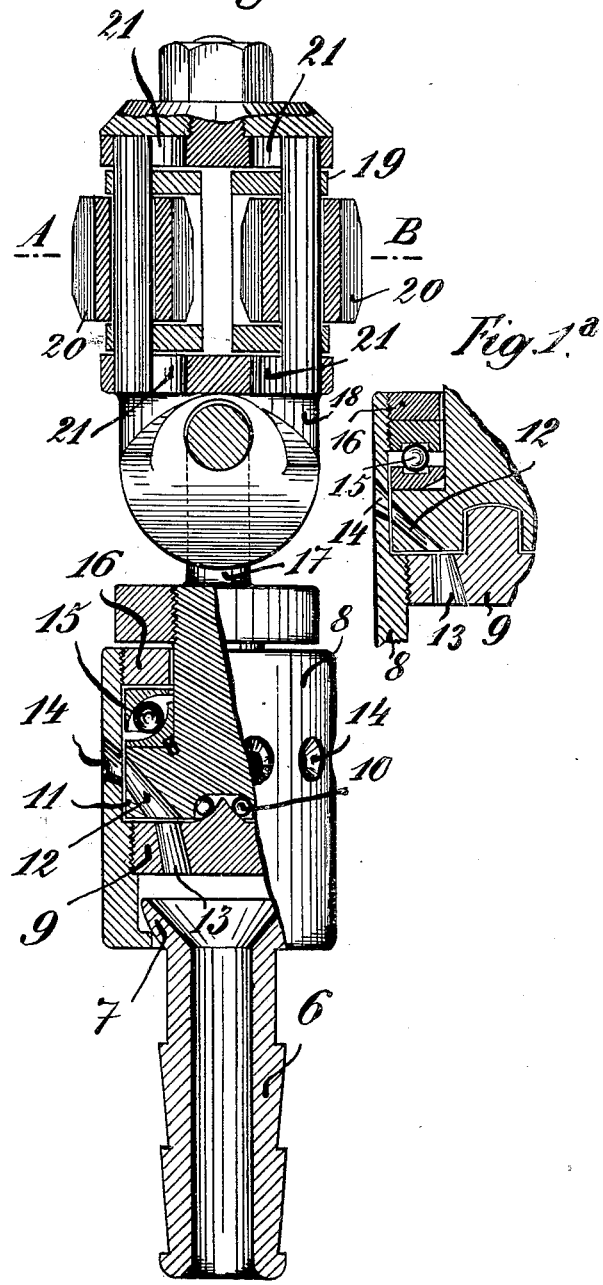

WILHELM MÜLLER, OF BERNBURG, GERMANY.

TURBINE FOR TUBE-CLEANERS.

1,126,553. Specification of Letters Patent. Patented Jan. 26, 1915.

Application filed November 12, 1913. Serial No. 800,592.

*To all whom it may concern:*

Be it known that I, WILHELM MÜLLER, engineer, a subject of the Emperor of Germany, residing at 29 Gartenstrasse, Bernburg, Kingdom of Prussia, Germany, have invented certain new and useful Improvements in Turbines for Tube-Cleaners, of which the following is a specification.

This invention relates to apparatus for cleaning or scaling tubes or pipes, such apparatus being hereinafter termed tube cleaners.

For cleaning or scaling boiler tubes and other tubular conduits in which scale or a mud crust is deposited, there is in use a device consisting of a turbine, driven by a fluid or gaseous medium and of a scraping or cutting tool pivotally jointed to the latter and itself movable. Devices of this kind as heretofore used, however, were not suitable for cleaning tubes of small bore, as for instance 45 to 20 mm., or having bends of small radius.

A tube cleaner to be practical and serviceable must firstly have all movable turbine parts incased on all sides so as to prevent jamming due to the presence of particles of scale or dirt; secondly have the outflow of the turbine radially arranged in order to allow space for the thrust bearing; thirdly have the outlet exit channels in the wall of the casing for the exhaust of the pressure medium extending in the direction of the rotor channels in order to prevent unnecessary losses in pressure; and lastly between the turbine and the nipple which is to be attached to the hose pipe, there should be a jointed connection so that bends of small radius may be passed without difficulty.

The tube cleaner constructed according to the present invention embodies these characteristics.

The invention will now be described more fully with reference to certain examples thereof shown by way of illustration in the accompanying drawing, in which:—

Figure 1 is a sectional elevation of one such example; Fig. 1ª shows a modified detail thereof.

Referring to the said figures:—6 is a hose nipple the end of which is connected with a turbine casing 8 by means of the ball joint 7. 9 is the stator or guide-wheel of the turbine, screwed into the turbine casing and also forming part of the ball supporting bearing 10 for the turbine rotor 11. The rotor channels 12 communicate on one side with the guide wheel channels 13 and on the other side with exhaust ports 14 in the walls of the casing. Owing to the fact that the rotor channels are both axially and radially arranged, the pressure bearing 15 has to be suitably constructed. A plug 16 screwed into the casing bears against the adjacent member of the thrust bearing 15, and beyond said plug is arranged a coupling 17 which connects the rotor with the tool 18. This tool forming no part of the present invention, has guide pieces 19 for the cutting wheels 20, the spindles of which run in slots provided in the drill chuck.

When the pressure fluid passes through the hose nipple 6, the turbine, and thereby the tool, is set in a rapid revolution. By pushing forward the hose pipe connected to the hose nipple the tube cleaner is gradually advanced along the tube which is being cleaned.

If a liquid is used as pressure medium, such liquid can also, after leaving the channels 14, be used for flushing and the removal of loosened dirt scale or crusty fragments; if air or gas under pressure is used, the particles are thereby blown out from the tube.

Although it has been hereinbefore mentioned that the device is preferably used for cleaning tubes of small bore, it is of course to be understood that it can be used also for tubes or pipes of large bore.

Having thus described my invention, I claim as new, and desire to secure by Letters Patent,—

A fluid driven turbine, comprising a one piece casing, a hose nipple movably seated in said casing, a rotor, a detachable stator bodily adjustable within the casing, forming a central bearing for the rotor, a plug closing the forward end of the casing, a ball bearing for the rotor seated on said plug, said stator having openings slightly inclined against the axis of the turbine, said rotor having channels communicating with the nipple through said openings and opening at the periphery of the rotor, and said casing being provided with radially directed ports registering with said channels; whereby the fluid will enter the turbine in an axial direction and leave it in a radial direction.

The foregoing specification signed at Magdeburg, Germany, this 29th day of October, 1913.

WILHELM MÜLLER.

In presence of—
L. OCHLMANN,
WILLY FIEDLER.

Copies of this patent may be obtained for five cents each, by addressing the "Commissioner of Patents, Washington, D. C."